United States Patent [19]

Metra

[11] 4,327,245

[45] Apr. 27, 1982

[54] SEALING END FOR DIRECT CURRENT ELECTRIC CABLES

[75] Inventor: Piero Metra, Varese, Italy

[73] Assignee: Industrie Pirelli, S.p.A., Milan, Italy

[21] Appl. No.: 159,121

[22] Filed: Jun. 13, 1980

[30] Foreign Application Priority Data

Jun. 21, 1979 [IT] Italy ............................... 23752 A/79

[51] Int. Cl.³ .......................................... H02G 15/064
[52] U.S. Cl. ..................................... 174/19; 174/73 R
[58] Field of Search .................... 174/73 R, 73 SC, 19, 174/102 R, 20, 75 D, 80; 324/54

[56] References Cited

U.S. PATENT DOCUMENTS

| | | | |
|---|---|---|---|
| 1,941,614 | 1/1934 | Meyer et al. | 174/73 R X |
| 2,386,185 | 10/1945 | Beaver et al. | 174/73 R |
| 2,748,184 | 5/1956 | Nicholas | 174/19 |
| 3,542,942 | 11/1970 | Johnson et al. | 174/73 R |
| 3,702,895 | 11/1972 | de Sio | 174/19 |
| 3,790,697 | 2/1974 | Buckingham | 174/102 R |
| 4,056,680 | 11/1977 | Aihara et al. | 174/73 R X |
| 4,204,083 | 5/1980 | Isotton | 174/19 X |

FOREIGN PATENT DOCUMENTS 561282 8/1958 Canada .............................. 174/73 R
850517 10/1960 United Kingdom .................. 174/19

*Primary Examiner*—Laramie E. Askin
*Attorney, Agent, or Firm*—Brooks, Haidt, Haffner & Delahunty

[57] ABSTRACT

A direct current cable, sealing end installation, the cable having a bared conductor end, a first semi-conductive screen around the conductor, a layer of insulating material around the screen, a second semi-conductive screen around the insulating layer and a conductive sheath around the second screen. The sheath the second screen and the insulating layer are stripped back to expose a portion of the second screen, a portion of the first screen and an intermediate length of the insulating layer. A hollow, cylindrical container with an inner diameter larger than the diameter of the cable extends lengthwise of the cable and from adjacent the bared conductor end to adjacent the sheath; and the container end adjacent the sheath has a liquid-tight connection to the sheath. The container is filled with liquid having a resistivity in the range from $10^8$ to $10^6$ ohm-meter to below the bared conductor end. Opposite ends of the liquid are respectively conductively connected to the bared conductor end and to the sheath. The length of the container and the liquid are sufficient to withstand the cable voltage between the conductor and the sheath. The conductor end and the insulating layer may be covered with tapes to prevent contact of the liquid therewith.

17 Claims, 5 Drawing Figures

SEALING END FOR DIRECT CURRENT ELECTRIC CABLES

The present invention relates to a sealing end, for electric cables and especially for direct current electric cables comprising, from the inside and radially towards the outside, a central conductor, a semi-conductive screen, an insulating layer, a second semi-conductive screen and a metal sheath.

In the electrical installations, it is known to use an accessory, called sealing end, encasing the cable end on which the following operations have already been performed: stripping of the free end of the conductor so as to permit electric connections with other circuits or only for carrying out tests, and removal, for a certain length around the cable insulating layer, the overlying semi-conductive screen and the metal sheath to improve the insulation with respect to the electric stresses occurring at the inside of the accessory.

These sealing ends use certain expedients for suitably graduating the electric potential along the insulating layer between the stripped central conductor at the operating voltage and the metal sheath, which is a ground, or earth potential, at the end of the insulating layer. Also, these sealing ends tend to avoid, in the best possible way, the irregular concentrations of the electric field at the cutting zone of the metal sheath, said cut being made to strip the insulating layer from the cable end.

The gradation of the potential must be, as much as possible, regular and uniform so as to avoid having accentuated discontinuities in the variations of the potential which are near the value of superficial dielectric constant of the insulating layer and which give rise to localized discharges. The term superficial dielectric constant of an insulating layer indicates and represents numerically the value of the electric field intensity according to which a discharge in air, or in the medium surrounding the insulating layer, is originated, said superficial dielectric constant being measured in kilo-Volts/millimeter.

In practice, in order to obtain the desired potential gradation and to avoid irregular concentrations of electric field near the sheath cut, a plurality of conductive armors are inserted, in some cases, into the insulating layer of the cable end from which the outermost semi-conductive screen has been removed, said plurality of conductive armors being connected to one another so as to constitute a circuit of condensers in series between the stripped conductor and the earthed metal sheath.

In other sealing end types, in order to avoid the irregular concentrations of electric fields, the extremity of the cable end has, at the entrance of the accessory, a device known as "stress-control cone" which provides a conical thickening of the insulation able to constitute a support for a conductive element and having a conical surface whose function is that of moving the maximum concentration of the electric field away from the cutting zone of the metal sheath.

Moreover, further types of sealing ends comprise armors for constituting condensers in the insulating layer and the stress-control cone. Around the stress-control cone and the insulating layer, there is a suitable envelope filled with insulating oil or impregnating compounds. By way of example, and in greater constructional detail, the sealing ends described in the French Pat. Nos. 1,563,570 and 1,016,870 are cited.

The cited sealing ends are applied to alternating current cables, i.e. to cases in which the distribution of the potential between rated voltage of the conductor and earthed metal sheath can be graduated by the capacitive voltage drop. When the sealing ends are applied to direct current cables, the distribution of the potential in said sealing ends is determined by the resistive voltage drops, and since the different components of the cable end, i.e., the insulating oil, the sealing end envelope and the stress-control cone can have very different values of electric resistivity, one from the other, and since the resistivities of the various materials can change differently from one another according to the temperature or to chemical-physical alterations, or in the long run, because of impurities of any kind on the outer parts, it is easily understandable how the sealing ends manufactured for A.C. cables, if used on D.C. cables, could give rise to a graduation of the potential different from that desired, with potential variations in some zones of the accessory which could also exceed the value of the superficial dielectric constant of the insulating layer of the cable end or of the surrounding means.

It is, moreover, apparent that the condenser sealing ends and/or the stress-control cone sealing ends require a very complicated and accurate construction involving a very long time for the construction thereof and excessive costs, in particular, if it is considered that said sealing ends sometimes are used only for a certain cable sample and for laboratory tests.

Unfortunately, up to the present time no further satisfactory solutions are known, and therefore, the present invention has, as one object, the provision of a sealing end for D.C. cables not having the above-mentioned drawbacks.

The principal object of the present invention is a sealing end for D.C. electric cables comprising, from the inside towards the outside, a conductor, a first semi-conductive screen, an insulating layer, a second semi-conductive screen and a metal sheath, said sealing end being characterized by the fact of comprising, a container encasing the cable end with a stripped conductor at the free end, the first screen, a stripped insulating layer having a length corresponding substantially to the length of the container and finally, suitably stepped, the second screen and the metal sheath, and comprising a liquid of electric resistivity in the range from $10^6$ to $10^8$ ohm-meter arranged within the container, said liquid, when the cable is under voltage, being subjected at one end of the container to the conductor potential and at the opposite end to the earthed potential at which the sheath also is.

Therefore, an essential characteristic of the sealing end according to the invention is the filling into a container of a liquid having a dielectric resistivity in the range from $10^6$ to $10^8$ ohm-meter and suitable for covering uniformly the whole exterior surface of the insulating layer of the cable end. By means of said arrangement, the liquid is subjected, at the respective opposite ends of the container, to the operating voltage of the central conductor and to ground voltage. Such liquid constitutes a preferred path for the current with respect to the insulating layer of the cable, and since said liquid has a uniform resistivity, a continuous graduation of the longitudinal potential results between the maximum voltage value of the central conductor and the earth.

Other objects and advantages of the present invention will be apparent from the following detailed description of the presently preferred embodiments thereof, which description should be considered in conjunction with the accompanying drawings in which.

Figure 1:
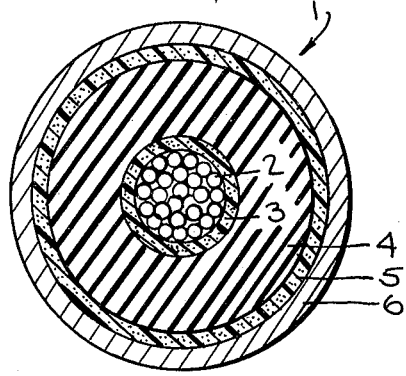
FIG. 1 is a transversal section of a cable with which the sealing end of the invention may be used.

The invention will be described with reference to a sealing end for a D.C. electric cable (FIG. 1) comprising from the inside and radially towards the outside, a central conductor 2 made of stranded, solid copper wires, with a total section, for example, of 400 mm$^2$, a semi-conductive screen 3 of polyethylene having conductive fillers therein, an insulating layer 4, for example, of polyethylene, a second semi-conductive screen 5 like the screen 3 and a metal sheath 6 of lead. Other components, such as longitudinal or transverse reinforcements constituted by metallic strips and further anti-corrosive protecting means could be applied around the sheath 6. For understanding the invention, it is, however, sufficient to refer only to what is shown in FIG. 1.

With respect to the materials of cable 1, it is to be pointed out that it is possible to use other types of insulation, for example, strips of synthetic material, impregnated paper, or any other insulating material having an electric resistivity which is in the range from $10^{10}$ to $10^{16}$ ohm-meter or higher.

Figure 2:
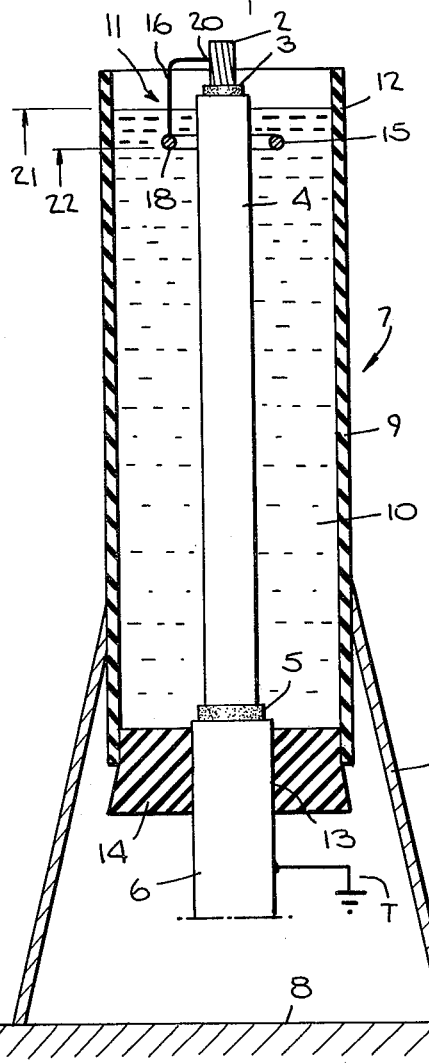
FIG. 2 is a longitudinal section of the sealing end mounted on a cable end.

FIG. 2 illustrates a preferred embodiment of the sealing end 7 for the cable 1 whic is suitable, for example, to be used in a closed room, laboratory or testing room and which is arranged in said room in a vertical position with respect to the floor 8 of a suitable structure 8'.

The sealing end 7 comprises, a cylindrical container 9, for example, of an electrically insulating material as polyvinylchloride, with a diameter more than twice the diameter of the insulating layer 4 of the cable 1. The end of the cable 1, previously prepared separately, extends inside the container 9, and a liquid 10 with an electric resistivity of $4 \times 10^7$ ohm-meter is within the container 9. Means 11 is provided for effecting an electrical connection between the liquid 10 and the central conductor 2 of the cable 1 at the upper end 12 of the container 9.

The semi-conductive screen 3, is exposed adjacent the free end of the stripped conductor 2, and then, for a long length, the insulating layer 4 has the screen 5 and the sheath 6 removed therefrom. At the end opposite from the stripped conductor 2, the cable end has the screen 5 with the sheath 6 removed therefrom and the sheath 6 tightly passes through a hole 13 of a suitable frusto-conical, elastomeric plug 14 inserted into the lower end of the container 9 and engaging, in a tight manner, the inner wall of the container 9.

The sheath 6 and the outer screen 5 are connected to earth potential in a known way not illustrated, but schematically represented in FIG. 2 with the conventional symbol and designated by letter T.

In the preferred embodiment of the sealing end shown in FIG. 2, the liquid 10 is boiled linseed-oil. Further specific examples of liquids which may be used for the purposes of the invention and which have an electric resistivity in the range from $10^6$ to $10^8$ ohm-meter are benzyl alcohol, dimethylformamide, furfural and octyl alcohol.

The sealing end 7 has been described with relation to an electric cable having an insulating layer 4 of polyethylene, but the same sealing end could be used, as already stated, for cables provided with other types of insulating layer, such as paper impregnated with insulating compounds or other materials, for some of which an incompatibility with the liquid 10 used could arise. In these cases, it is possible to provide around the cable insulation a layer of another material which is at the same time impermeable to liquids and compatible with the insulating layer and which has, for reasons explained later on, an electric resistivity intermediate that of the insulating layer 4 and that of the liquid 10.

As already stated, the sealing end 7 comprises electrical connecting means 11 extending between the liquid 10 and the stripped conductor 2, in order to avoid a direct contact between the conductor 2 and the liquid 10 and to prevent the penetration of the liquid into the copper strands and from there towards the insulating layer, for example, in order to avoid a swelling of the insulating layer or, when there are incompatibility reasons, of the liquid with particular insulating materials or also, for example, in order to eliminate eventual undesirable phenomena, such as the chemical etching of the insulating layer which could occur in the long run, because of temperatures encountered.

In the embodiment shown in FIG. 2, said means 11 comprises, a metallic ring 15 arranged around the insulating layer 4 and a wire 16 welded at one end 18 to the ring 15 and at the opposite end 20 to the copper wire of the conductor 2. The wire 16 acts as conductor and as support for the ring.

In this case, the level of the liquid 10 in the container 9 for maintaining the equipotential electric connection between the upper part of the liquid and conductor 2 can vary. However, the level should be between the two planes 21 and 22 parallel to the plane of the floor 8 and delimiting respectively the upper limit to which the liquid should rise, or should be near, and the lower limit under which there is no more contact between the liquid 10 and the metallic ring 15.

Figure 3:
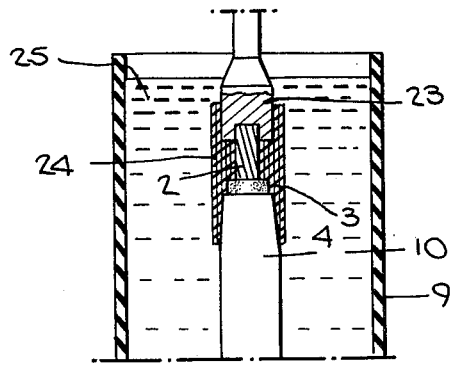
FIG. 3 is similar to FIG. 2 and illustrates an alternate embodiment of the sealing end.

In an alternative embodiment according to the present invention illustrated in FIG. 3, the connecting means are constituted by the simple contact of the liquid 10 with a suitable metallic clamp 23 firmly secured to a portion of the stripped conductor 2 but which, however, does not cover the portion of the conductor 2 near the insulating layer. Before the application of the clamp 23 on the conductor 2, the end of the insulating layer 4 is shaped according to a frusto-conical configuration and, after having applied the clamp 23 onto the stripped conductor 22, suitable tapings 24, for example of rubber, are arranged according to known techniques between the clamp 23 and the insulating layer 4, said tapings being suitable for forming a barrier against the penetration of the liquid 10 into the copper strands in the zones where the clamp 23 does not cover the stripped conductor 2.

In this case, in order to guarantee the equipotential electrical continuity between conductor 2 and upper portion of the liquid 10, the level of the liquid itself cannot fall under the horizontal plane 25, where the rubberized tapes 24 cover the clamp 23. However, if the tapings 24 were to be made of materials having conductive characteristics, it is apparent tht the level of the liquid 10 can be as low as the lower end of the tapings 24.

As a further example of the connecting means 11, the ring 15 can be a metallic sleeve forced or screwed into the end 12 of the inner walls of the container 9 of insulating material and connected by means of a wire 16 to the stripped conductor 2. In this embodiment the liquid 10 in contact with the sleeve, by means of the wire 16, determinates the equipotential electrical connection with the conductor 2.

The assembling of the sealing end is very easy. As already stated, the cable end is prepared separately according to the stepped configuration shown in FIG. 2. Subsequently, the plug 14 is inserted into the lower end of the container 9 and the cable end is inserted through the hole 13 of the plug. Finally, according to the preferred embodiment of FIG. 2, the ring 15 is put in place and connected to the stripped conductor 2, and the container 9 is filled with boiled linseed-oil.

The sealing end 7 is then ready for being tested and for the desired connections and does not need any further closing element at the upper end of the container 9, both because the boiled linseed-oil in contact with the air forms a protective film, and because the impurities present in the room even if absorbed by the liquid 10, before forming the film, are of small size and do not give rise to an alteration of the conductivity characteristics of the boiled linseed-oil.

Now, the operation, of the sealing end of FIG. 2 will be explained with the help of the simplified circuit diagram of FIG. 4 in which between the voltage VA of the stripped conductor 2 and the earthed sheath 6 there are schematically represented the equivalent resistance of each of the various parts of the sealing end 7 between the opposite ends of the container 9 which are traversed by the currents. Such resistive paths are indicated respectively by resistors, the resistors $RL_1$, $RL_2$, $RL_3$, representing the current paths in the liquid 10, the resistors $Ri_1$, $Ri_2$, $Ri_3$, in the insulating layer, and the resistors $Rc_1$, $Rc_2$, $Rc_3$, in the container. In the circuit, each resistor of the liquid paths is connected in parallel to the other resistors of equal sections, and the transverse resistive paths of the insulating layer followed by the radial currents have been indicated with $Rti_1$, $Rti_2$ and $Rti_3$.

Figure 4:
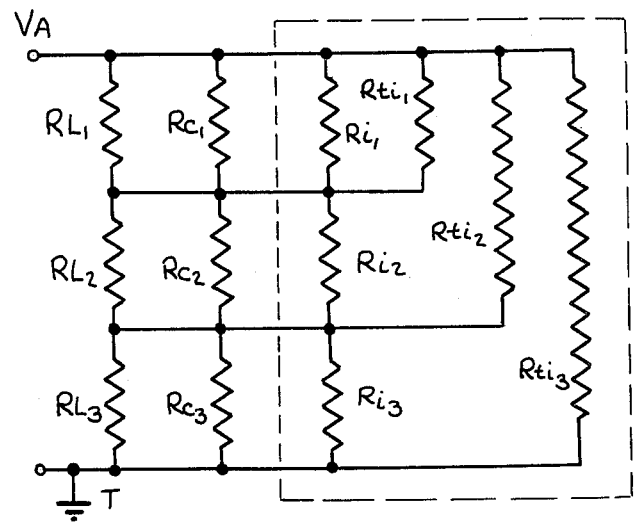
FIG. 4 is an electrical circuit diagram of the sealing end.

The circuit of FIG. 4 is very simplified with respect to reality, but the parameters and the diagram correspond with good approximation to what is necessary in practice to determine the longitudinal distribution of the potential.

When the sealing end is under voltage, the three essential branches of the circuit, that relating to the liquid, to the container and the insulating layer (this latter, as a whole, being surrounded by a dotted line in FIG. 4) are traversed by current. However, for the value of resistivity of the liquid 10, in the preferred example boiled linseed-oil, in relation to that of the other insulating materials and for the geometry of the cable and of the container with thin walls, resistance of the liquid is less than one tenth of the resistance of the other paths in parallel therewith. Therefore, only the current circulating in the liquid needs to be considered, and the circuit of FIG. 4 may be reduced to only the resistors of the liquid $RL_1$, $RL_2$, $RL_3$.

Figure 5:
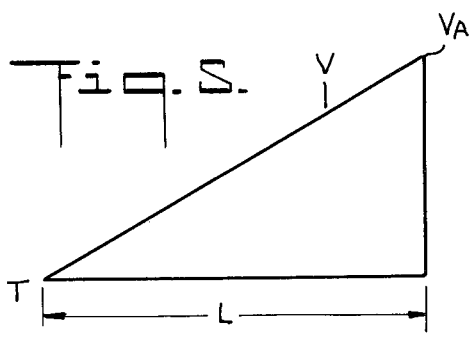
FIG. 5 is a graph of the distribution of the potential in the sealing end.

Therefore, it is possible to state that only the voltage drops along the liquid 10 give rise to the longitudinal variations of the potential from the maximum value, corresponding to the potential of the stripped conductor 2 to the minimum value of the earth. Between these two values, the variation of the potential, at least theoretically, is rectilinear and varies at a constant rate as is shown in the diagram of FIG. 5, the ordinates representing the potential measured in kilovolts and the abscissa representing distance. The right side, which has been marked with VA, is the position of the stripped conductor 2. The length L of the intermediate length corresponding to the insulating layer 4 in contact with the liquid 10 extends to the left, and T represents the point of the earthed sheath 6 at the end of the insulating layer length L.

The constant rate, rectilinear variation of the potential (V), illustrated in FIG. 5, depends on the fact that the volume taken by the liquid 10 inside the container 9 is fairly great so that eventual concentrations of a component of the liquid 10 with respect to others, or eventual impurities, tend to minimize themselves and this, together with the certain and uniform contact of the liquid 10 with the insulating layer 4, produces a uniform resistance of the liquid 10 for each unit of length along the whole insulating layer.

Moreover, the gradual variation of the potential is furthermore favored by the fact that if the zones are eventually overheated for any reason, so that non-uniform distributions of path resistance and, therefore, discontinuous variations of the potential could occur, such non-uniformity tends to disappear since the convection motions continuously mix the liquid 10, thereby stabilizing the temperature.

The mixing favors, moreover, the uniformity of the liquid 10 and the applicant has found that the optimum results are reached by means of a container having an internal diameter more than twice the diameter of the insulating layer 4 on the cable 1 and containing boiled linseed-oil whose viscosity can be compared with that of the liquids used for electrical equipment in order to favor dissipation of heat.

The liquid 10 can have a resistivity different from that indicated in the example, on the condition that it is between $10^8$ and $10^6$ ohm-meter since with similar geometric dimensions of the container 9 and of the cable 1, but with different insulating layers, a resistivity value greater than $10^8$ ohm-meter should give rise, for insulating materials of the layer 4 (FIG. 2) which are of lower resistance, to a longitudinal distribution of the potential no longer uniform as appearing in FIG. 5 owing to the excessive influence of the radial currents in the insulating layer 4. In this case, the simplified wiring diagram of FIG. 4, which was reduced to that of only the resistors of the liquid 10, would no longer be valid as it is no longer possible to disregard the effect of the transversal resistors $Rti_1$, $Rti_2$ and $Rti_3$, per se quite small, for the geometry of the cable.

If liquids having values of resistivity lower than $10^6$ ohm-meter were to be used, the increase of the current in the liquid 10 should produce a higher heating with the risk of raising the temperature to levels intolerable for the insulating layer and the liquid itself, besides, of course, a not disregardable consumption for the voltage generator.

The sealing end 7, according to the invention, can also operate properly with a liquid incompatible with the insulating layer 4 provided that an intermediate barrier, for example, polyvinylchloride tapes, are adhesively secured to the insulating layer 4, with a thickness less than that of the insulating layer 4. For example, the tape thickness could be a tenth part of a millimeter. In this case, between liquid 10 and innermost layer of the insulating layer 4, in a radial sense to the sealing end, there is a voltage difference caused by the voltage value of the stripped conductor 2 and by the potential value of the liquid 10 at that point. Therefore, under said difference of voltage, there is a radial current which involves the liquid 10, the barrier of tapes and the insulating layer 4, with relative voltage drops on such parts.

The applicant has found as further characteristic of the invention that the value of resistivity of the barrier tapes must be intermediate between that of the insulating layer 4 and the liquid 10 so as to produce in radial sense at the ends of the barrier a voltage difference which is not sufficient to cause the perforation of the barrier itself and, therefore, the contact of the liquid 10 with the insulating layer 4, which, as stated, cannot be permitted due to the incompatibility of the liquid and the insulating layer.

By way of example, the sealing ends according to the invention can be used for D.C. electric cables up to 1000 kV, with a container 9 having a length of about one meter for every 200 kV of voltage, and can be used in closed rooms or in the open air, providing, in this latter case, a closure for the container 9 and porcelain insulators arranged around the container and/or use of a container 9 of porcelain.

The sealing end can be used in vertical position or can also be used in horizontal position if the alternative embodiment of FIG. 3 is used.

Moreover, it has been proved that the sealing ends according to the invention, if applied in the open air, are much less subjected to surface discharges along the insulator with respect to those known. In fact, eventual atmospheric impurities lying on the insulator, although reducing the surface resistance, do not lead, in a short time, to a resistance comparable to that of the liquid 10 inside the container 9. Therefore, if the sealing end, provided with resistive liquid, is already per se such that it can be used in air at the operating voltages, and consequently, operates reliably, it can be stated that said sealing end is less sensitive to the outer discharges on the insulator 9 than those known.

Although preferred embodiments of the present invention have been described and illustrated, it will be apparent to those skilled in the art that various modifications may be made without departing from the principles of the invention.

The embodiments of the invention in which an exclusive property or privilege is claimed are defined as follows:

1. A sealing end installation on a direct current cable, said cable comprising a conductor, a sheath around said conductor and layers of material, including a layer of semiconductive material and a layer of cable insulation, intermediate said sheath and said conductor, said layer of insulation having a resistivity of at least $10^{10}$ ohm-meter, said layers and said sheath being removed from around an end portion of said conductor to provide an end portion of said conductor from which the layers and said sheath have been removed and the sheath and all the layers of the cable outwardly of a length of said cable insulation which is adjacent said end portion of said conductor being removed from around said length of said cable insulation to provide an end of said sheath spaced longitudinally of said cable from said end portion of said conductor and to provide an exposed length of said cable insulation which extends substantially from said end portion of said conductor to said end of said sheath, a hollow container of insulating material which retains liquid disposed around said exposed length of cable insulation, said container having its inner wall spaced outwardly from said exposed length of cable insulation to provide a space between said exposed length of cable insulation and said inner wall for receiving a liquid and said container extending from adjacent said end portion of said conductor to adjacent the end of said exposed length of said cable insulation remote from said end portion of said conductor and having a length longitudinally of said conductor sufficient to withstand the voltage between said conductor and said sheath without breakdown, a liquid having a resistivity in the range from $10^8$ to $10^6$ ohm-meter in said space between said inner wall of said container and said exposed length of cable insulation and extending from adjacent said end portion of said conductor to adjacent said end of said exposed length of cable insulation remote from said end portion of said conductor, said liquid being free to circulate within said space and to contact said inner wall of said container and substantially all of said exposed length of cable insulation, and said liquid being conductively connected to said conductor at the end of the liquid nearer said end portion of said conductor and being conductively connected at the opposite end of the liquid to said sheath to provide a direct current path through said liquid and from said end portion of said conductor to said sheath which has a resistivity no greater than one-hundredth of the resistivity of said cable insulation, the longitudinal length of said direct current path and the longitudinal length of the exposed length of cable insulation within said container being sufficient to withstand the voltage between said conductor and said sheath without breakdown, and sealing means providing a fluid-tight seal between said sheath and a portion of the container adjacent said end of said exposed length of cable insulation remote from said end portion of said conductor.

2. A sealing end installation on a direct current cable as set forth in claim 1 wherein said layer of semi-conductive material is a first semi-conductive screen intermediate said conductor and said layer of cable insulation and said cable comprises a second semi-conductive screen intermediate said layer of cable insulation and said sheath and wherein said first screen has a portion adjacent said end portion of said conductor which is without said layer of cable insulation thereon and said second screen has a portion adjacent said end of said exposed length of cable insulation which is without said sheath thereon.

3. A sealing end installation or a direct current cable as set forth in claims 1 or 2 wherein said liquid is boiled linseed oil.

4. A sealing end installation or a direct current cable as set forth in claim 3 wherein said container is made of polyvinylchloride.

5. A sealing end installation on a direct current cable as set forth in claims 1 or 2 wherein said liquid does not contact said end portion of said conductor and wherein said liquid is conductively connected to said conductor by connecting means contacting said end portion of said conductor and said liquid adjacent said end portion of said conductor.

6. A sealing end installation on a direct current cable as set forth in claim 5 wherein said container has its longitudinal axis extending vertically and the upper level of said liquid is adjacent the upper end of said exposed length of cable insulation and wherein said connecting means comprises a conductive ring adjacent the upper end of said exposed length of cable insulation, extending around said exposed length of cable insulation and contacting said liquid and conductive means interconnecting said end portion of said conductor and said ring.

7. A sealing end installation on a direct current cable as set forth in claims 1 or 2 further comprising a conductive means secured to a part of the end portion of said conductor in liquid-tight relation thereto and insulating means engaging said conductive means in liquid-tight relation thereto and surrounding the remainder of said end portion of said conductor for preventing contact of said liquid with said end portion of said conductor and wherein said liquid contacts said conductive means.

8. A sealing end installation on a direct current cable as set forth in claim 7 wherein said insulating means is polyvinylchloride tape wrapped around said end portion of said conductor.

9. A sealing end installation on a direct current cable as set forth in claims 1 or 2 wherein said sealing means comprises an elastomeric plug having its periphery in liquid-tight engagement with the end of said container remote from said end portion of said conductor and having an opening therethrough in which said sheath is received in liquid-tight engagement with said plug.

10. A sealing end installation on a direct current cable as set forth in claims 1 or 2 wherein the length of said container is about one meter per 200 kilovolt of the voltage between said conductor and said sheath.

11. A sealing end installation on a direct current cable as set forth in claims 1 or 2 wherein the inner diameter of said container is at least twice the diameter of said exposed length of cable insulation.

12. A sealing end installation on a direct current cable as set forth in claims 1 or 2 wherein said liquid fills the space between the inner wall of said container and said exposed length of cable insulation and is in contact with both the inner wall of said container and said exposed length of cable insulation.

13. A sealing end installation on a direct current cable as set forth in claims 1 or 2 further comprising a further layer of insulating material applied around and in contact with only a portion of the exposed length of cable insulation which is adjacent to said end portion of said conductor and around and in contact with a portion of said end portion of said conductor, said further layer of insulating material being impervious to said liquid to prevent contact of said liquid with said portion of said exposed length of cable insulation and with said end portion of said conductor and being thin relative to the thickness of said layer of cable insulation, said further layer of insulating material having a resistivity intermediate the resistivity of said liquid and the resistivity of said layer of cable insulation.

14. A sealing end installation on a direct current cable as set forth in claim 13 wherein said further layer of insulating material is a layer of tape adhesively secured to said portion of said length of cable insulation.

15. A sealing end installation on a direct current cable as set forth in claim 14 wherein said tape is a polyvinylchloride tape.

16. A sealing end installation on a direct current cable as set forth in claim 13 wherein said further layer of insulating material has a thickness of the order of a tenth of a millimeter.

17. A sealing end installation on a direct current cable as set forth in claim 13 wherein said layer of cable insulation comprises paper impregnated with an insulating material.

* * * * *

UNITED STATES PATENT AND TRADEMARK OFFICE
CERTIFICATE OF CORRECTION

PATENT NO. : 4,327,245
DATED : April 27, 1982
INVENTOR(S) : Piero Metra

It is certified that error appears in the above—identified patent and that said Letters Patent is hereby corrected as shown below:

Col. 3, line 34, "whic" should read --which--

Col. 4, line 66, "tht" should read --that--

Col. 8, line 49, "or" should read --on--

Col. 8, line 52, "or" should read --on--.

Signed and Sealed this

Twelfth Day of October 1982

[SEAL]

Attest:

Attesting Officer

GERALD J. MOSSINGHOFF

Commissioner of Patents and Trademarks